United States Patent
Tohgi et al.

(10) Patent No.: US 7,294,776 B2
(45) Date of Patent: Nov. 13, 2007

(54) CONTENT SUPPLY METHOD AND APPARATUS

(75) Inventors: Yutaka Tohgi, Hamakita (JP); Toshihisa Sadakata, Hamamatsu (JP); Gary Gregson, West Sussex (GB)

(73) Assignee: Yamaha Corporation, Hamamatsu-shi (JP)

( * ) Notice: Subject to any disclaimer, the term of this patent is extended or adjusted under 35 U.S.C. 154(b) by 404 days.

(21) Appl. No.: 10/757,121

(22) Filed: Jan. 14, 2004

(65) Prior Publication Data

US 2004/0159215 A1    Aug. 19, 2004

(30) Foreign Application Priority Data

Jan. 15, 2003    (JP) .............................. 2003-007437

(51) Int. Cl.
*H04K 1/00*    (2006.01)
(52) U.S. Cl. .......................... 84/600; 713/185
(58) Field of Classification Search .......... 84/600–602; 713/185
See application file for complete search history.

(56) References Cited

U.S. PATENT DOCUMENTS

| | | | | |
|---|---|---|---|---|
| 5,629,980 | A * | 5/1997 | Stefik et al. | 705/54 |
| 6,570,080 | B1 | 5/2003 | Hasegawa | |
| 2001/0044848 | A1 | 11/2001 | Kikuchi et al. | |
| 2002/0000156 | A1 | 1/2002 | Nishimoto et al. | |
| 2002/0107806 | A1 | 8/2002 | Higashi et al. | |
| 2002/0112171 | A1 * | 8/2002 | Ginter et al. | 713/185 |
| 2002/0120579 | A1 | 8/2002 | Kawaguchi | |
| 2003/0182236 | A1 | 9/2003 | Tanaka et al. | |

FOREIGN PATENT DOCUMENTS

| | | |
|---|---|---|
| EP | 0 679 979 A1 | 11/1995 |
| JP | 8006784 | 1/1996 |
| JP | 10031587 | 2/1998 |
| JP | 10-275186 | 10/1998 |

(Continued)

OTHER PUBLICATIONS

European Patent Office, "Search Report" Mar. 03, 2005.

(Continued)

*Primary Examiner*—Lincoln Donovan
*Assistant Examiner*—David S. Warren
(74) *Attorney, Agent, or Firm*—Pillsbury Winthrop Shaw Pittman LLP (57) ABSTRACT

Client apparatus (10, 11, 12, ...) receives, from a server (20) or CD-ROM, content data and first management information that enables trial use of the content data and store the received content data and first management information in an HDD. When a user of the client apparatus desires normal use of the stored content data, the client apparatus (10, 11, 12, ...) issues a normal use request to the server (20). Then, the client apparatus receives, from the server, second management information that authorizes the normal use of the content data. Thus, only the client apparatus, to which an authorization for the normal use, is allowed to reproduce the content data in a normal mode with no reproduction function limitation on the basis of the second management information. In this way, the inventive arrangements permit efficient delivery of trial and purchasing content, but also can enhance security against unfair use, such as unauthorized copying, of the content.

19 Claims, 5 Drawing Sheets

FOREIGN PATENT DOCUMENTS

| | | |
|---|---|---|
| JP | 2001-042866 | 2/2001 |
| JP | 2002259606 | 9/2002 |
| JP | 2002342518 | 11/2002 |

OTHER PUBLICATIONS

The State Intellectual Property Office of the People's Republic of China, "The First Office Action", (May 19, 2006).

Office Action, "Notice of Grounds for Rejection" (regarding patent appln. No. 2003-007437), Japanese Patent Office (Japan), (Feb. 27, 2007).

Office Action, "Notice of Grounds for Rejection" (re Patent Application No. 2003-007437), Japanese Patent Office (Japan) dated Jun. 5, 2007.

* cited by examiner

CONTENT SUPPLY METHOD AND APPARATUS

BACKGROUND OF THE INVENTION

The present invention relates to an improved client apparatus and server apparatus applicable to a system which supplies desired content, such as music content, to interested users via a communication network, and an improved communication method for supplying desired content, such as music content, to interested users via a communication network.

In recent years, delivering various digital content, such as music content and image content, via the Internet or other communication network has become very popular. Any interested user can purchase or acquire music or other desired content by connecting his or her personal computer or communication terminal, such as a portable phone (e.g., cellular phone), to a communication network and downloading the desired content from an information provider (server) that supplies a multiplicity of music and/or other content. Japanese Patent Application Laid-open Publication Nos. HEI-10-275186 and 2001-42866 corresponding to U.S. Pat. No. 6,570,080, etc. disclose a content supply system, which allows sample or trial content to be supplied to an interested user so that the user can decide on purchasing desired content after having actually reproduced the supplied trial content, e.g. after having test-listened to the trial content if the supplied trial content is music content. The "trial content" is, for example, content providing only a part of a music piece data set, or content having limited reproducibility, such as a limited reproducible time length. Heretofore, it has been conventional for a server to transmit trial content in response to a trial use request from a client apparatus and then transmit separate purchasing content (i.e., regular content to be purchased) in response to completion of a predetermined content purchase procedure performed by the user of the client apparatus.

The conventionally-known technique, where sample or trial content and purchasing content is transmitted separately, would present poor usability because there is a need for a user to perform content downloading twice in order to acquire desired purchasing content. Particularly, where the user's computer is incapable of high-speed data transfer, it would take a very long time to acquire the desired content, which tends to greatly degrade convenience of the content supply service.

If same content is used both as trial content and as purchasing content as was the case with the traditional technique, then downloading the content only once would suffice. In many of such cases, an information provider gives a predetermined serial number to each person who has completed a predetermined content purchase procedure, so that, unless the serial number is entered by a requesting person, the provider only allows the content to be reproduced as trial content with limited reproducibility; only when the serial number has been entered by the requesting person, the provider allows the requested content to be reproduced normally with no reproducibility limitation. However, in case the requesting person copies both the supplied content and serial number, the provider can not appropriately prevent the supplied content from being used limitlessly. Thus, this technique could not provide sufficient security against unfair use of the supplied content.

SUMMARY OF THE INVENTION

In view of the foregoing, it is an object of the present invention to provide a technique for not only permitting efficient delivery of trial content and purchasing content but also enhancing security against unfair use, such as unauthorized copying, of the content.

In order to accomplish the above-mentioned object, the present invention provides a method for execution by a client apparatus, connected to a communication network, to receive content data, which comprises: a step of receiving, from an external content supplier, content data and first management information that enables trial use of the content data and then storing the received content data and first management information in memory; a step of, in response to operation of a user of the client apparatus desiring normal use of the content data stored in the memory, issuing a normal use request to a server apparatus also connected to the communication network; a step of receiving, via the communication network, second management information supplied by the server apparatus in response to the normal use request, the second management information authorizing the normal use of the content data; and a step of, in response to reception of the second management information from the server apparatus, replacing the first management information corresponding to the content data of which the normal use is requested, stored in the memory, with the received second management information.

The present invention also provides a method for execution by a server apparatus to supply content data to a client apparatus connected to a communication network, which comprises: a step of receiving, via the communication network, a normal use request of content data from a client apparatus having already stored therein the content data and first management information that enables trial use of the content data; and a transmission step of determining, in response to the normal use request received from the client apparatus, whether the normal use of the content data is allowable or non-allowable, and transmitting second management information authorizing the normal use of the content data to the client apparatus via the communication network if the normal use of the content data has been determined as allowable. In response to reception of the second management information from the server apparatus, the client apparatus replaces the first management information, corresponding to the content data of which the normal use is requested, with the second management information, so that the normal use of the content data is permitted.

The present invention may be constructed and implemented not only as the method invention as discussed above but also as an apparatus invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE EMBODIMENTS

Figure 1A:
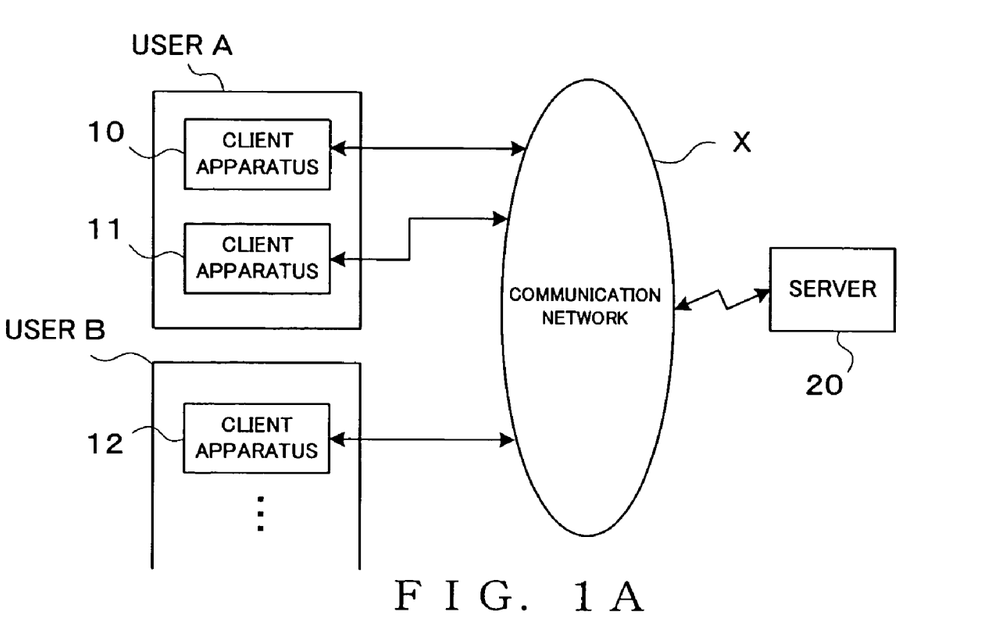
FIG. 1A is a block diagram showing a music content supply system in accordance with an embodiment of the present invention, and particularly showing an example manner in which the music content supply system is connected to a communication network.

FIG. 1A is a block diagram showing a music content supply system in accordance with an embodiment of the present invention, and particularly showing an example manner in which the music content supply system is connected to a communication network. Namely, in FIG. 1A, a server 20 managing a music content selling site is connected to the communication network X, such as the Internet, and a plurality of client apparatus 10, 11, 12, . . . can access the server 20 via the communication network X. Each of the client apparatus 10, 11, 12, . . . can perform various processes, such as processes for installation, downloading, test-listening, reproduction, purchase, etc. of music content, using an application program dedicated to implementation of processing based on the present invention (hereinafter referred to as a "dedicated application program"). The server 20 is an apparatus that performs a music content supply (selling) process in accordance with the present invention; the server 20 at least receives a music content purchase request (i.e., request for normal or regular use of content data) from a user of any one of the client apparatus via the communication network X, and gives the client apparatus, having completed a predetermined purchase procedure, an authorization for regular or normal use of the music content. In the illustrated example of FIG. 1A, if the client apparatus 10 possessed by one user A has purchased given music content, any other apparatus, such as the client apparatus 11 and 12 possessed by user A and user B, are inhibited from using the purchased music content, as will be understood from the description to be given later.

Figure 1B:
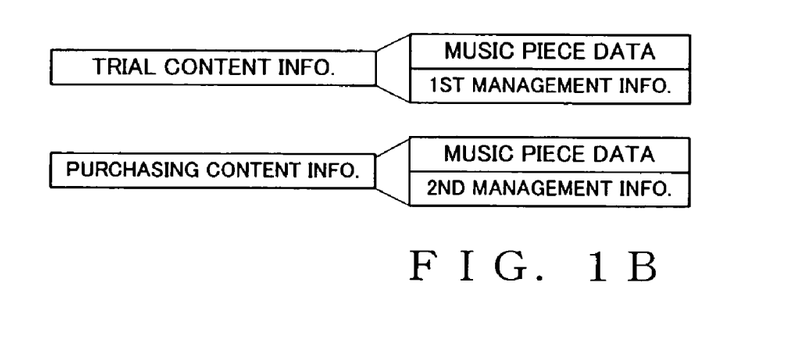
FIG. 1B is a diagram conceptually showing an example of a data organization of music content supplied in the music content supply system.

In the inventive music content supply system of FIG. 1, the client apparatus 10, 11, 12, . . . can use two types of music content: "trial content information" supplied on a free-of-charge basis for music piece test-listening purposes; and "purchasing content information" supplied on condition that a predetermined purchase procedure has been completed by a requesting user, as seen in FIG. 1B. Each of the "trial content information" is a data set that is composed of a music piece data set and first management information corresponding to the music piece data set, which is used to enable test-listening or limited reproduction of the music content. Each of the "purchasing content information" is, on the other hand, a data set that is composed of a music piece data set and second management information corresponding to the music piece data set, which is used to enable normal or non-limited reproduction of the music content (after completion of the predetermined purchase procedure).

In the instant embodiment, the music piece data set in each of the "trial content information" and "purchasing content information" can not be reproduced alone, i.e. without the corresponding first or second management information, and the trial content information and purchasing content information pertaining to the same content may be identical to each other in substance and quality of the content data to be used for reproduction of a music piece. Each of the first and second management information is information for controlling normal use/trial use of the corresponding music piece data set. When the music piece data set is reproduced on the basis of the first management information, the music piece in question is reproduced for test-listening, for example, by limiting, on the basis of the first management information, a time over which the music piece data can be reproduced and thereby applying a reproduction function limitation. When, on the other hand, the music piece data set is reproduced on the basis of the second management information, the music piece data set can be reproduced normally with no reproduction function limitation; that is, the user can obtain an authorization for normal use of the music piece. Namely, according to the present invention, once given "trial content information" is input to a given client apparatus, the substance (i.e., music piece data) of the content information is stored into the client apparatus but the reproducibility of the music piece data is limited by the first management information, so as to make the data set a test-listening music piece data set. Then, after the user has completed the predetermined purchase procedure, the given client apparatus can acquire, from the server 20, the corresponding "purchasing content information" permitting normal reproduction of the desired music piece data set, by only obtaining, from the server 20, the second management information corresponding to the desired music piece data set. Therefore, with the present invention, it suffices to download the desired music piece data set only once at the time of the acquisition of the "trial content information". The downloaded music piece data set stored in the client apparatus can be reproduced normally with no limitation, by the user of the client apparatus just obtaining the corresponding second management information, i.e. without having to again download the desired music piece data set.

The trial content information may be supplied from a CD-ROM having stored therein trial content information of one or more music pieces, or may be downloaded via the Internet from the server 20. As will be later detailed, in supplying the first management information or second management information, the individual data set are supplied to the client apparatus in a form encrypted with respective predetermined encryption schemes. Specifically, in the instant embodiment, all the trial content information (each comprising a music piece data set and first management information) is encrypted with a same (i.e., common) conventionally-known first key using a dedicated application program, while the second management information is encrypted with a second encryption key based on information specific to each client apparatus (namely, information specific to the hardware construction of the client apparatus in question).

Figure 2:
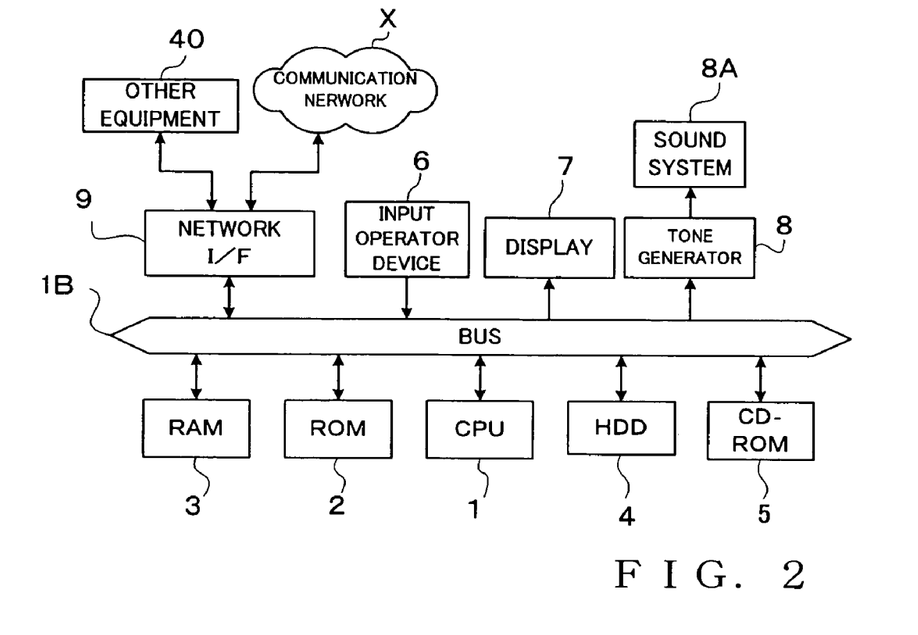
FIG. 2 is a block diagram showing a general hardware setup of a computer that can be used as a client apparatus or server in the embodiment.

FIG. 2 is a block diagram showing a general hardware setup of a computer (personal computer) that can be used as the client apparatus 10, 11, 12, . . . or the server apparatus 20. The following paragraphs representatively describe an example construction of the client apparatus using the computer, with reference to FIG. 2.

As shown in FIG. 2, the client apparatus includes a CPU 1, to which are connected, via a communication bus 1B, a ROM 2, RAM 3, hard disk device (HDD) 4, CD-ROM 5, input operator device 6, including a mouse and keyboard, display device 7, tone generator 8, network interface 9, etc.

The CPU 1 executes various programs stored in the ROM 2, RAM 3, and/or other memory to control all operations of the client apparatus. The various programs to be executed by the CPU 1 include the above-mentioned dedicated application program. The dedicated application program is stored in any of the ROM 2, HDD 4 and/or other suitable memory. Further, the dedicated application program may be supplied to the client apparatus from the CD-ROM 5, or delivered via a network interface 9 from the server 20.

Each of the client apparatus 10, 11, 12, . . . is connected via the network interface 9 to the communication network X, such as the Internet, LAN or telephone network, so that it can communicate, via the communication network X, various items of information, such as programs, music piece data, first management information and second management information. Each of various items of content, such as music piece data, first and second management information, supplied to the client apparatus is stored in the hard disk device (HDD) 4 in a form encrypted with a corresponding predetermined encryption key, and it is decrypted by a decryption function of the dedicated application program when it is to be used, i.e. when it is to be transferred to the RAM 3.

Further, each of the client apparatus is connectable via the network interface 9 with external or other equipment 40, such as another computer or electronic musical instrument. The tone generator 8 is capable of generating a tone signal on the basis of tone data supplied via the communication bus 1B, and the thus-generated tone signal is audibly reproduced or sounded via a sound system 8A including an amplifier, speaker, etc. Note that the tone generator 8 may employ any of the conventionally-known tone signal generation methods, such as the waveform memory method, and may be implemented by dedicated hardware or by software processing performed by the CPU 1.

It should also be appreciated that the client apparatus may be in the form of not only a general-purpose computer like a personal computer or a communication terminal apparatus like a portable phone but also other type of equipment, as long as it can be connected to the communication network X. For example, an electronic musical instrument or the like capable of being connected to the communication network X is applicable as the client apparatus in the instant content supply system.

Figure 3:
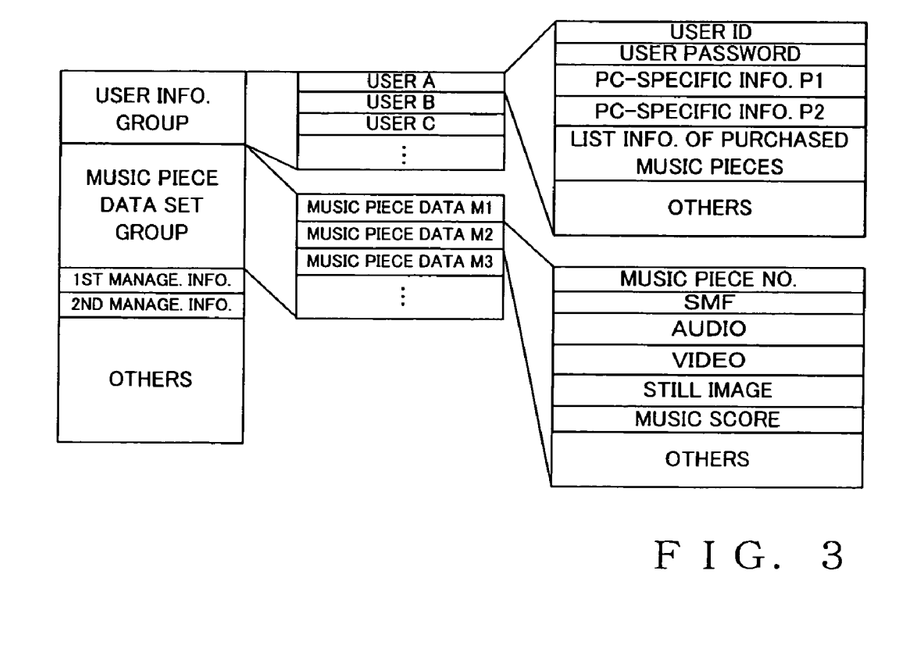
FIG. 3 is a diagram showing an example of stored contents in a hard disk device of the server in the embodiment.

Example of stored contents of the hard disk device (HDD) 4 in the server 20 is explained below with reference to FIG. 3. As shown in FIG. 3, the hard disk device 4 stores a plurality of items of user information (user information group), a plurality of music piece data sets (music piece data set group), and a plurality of items first and second management information corresponding to the plurality of music piece data sets. The server 20 possesses the user information (information of user A, user B, user C, . . . ) corresponding to a plurality of the client apparatus where the dedicated application program is installed. Each item of the user information is such information that is given to the server 20, for example, through a predetermined user registration process carried out when the user has accessed the server 20 after having the dedicated application program installed in his or her client apparatus. As the user information of each user, there are preferably stored, for example, a user ID (login ID), user password (login password), list of music pieces having been purchased by the user, and one or more items of information specific to the client apparatus having made the user registration (hereinafter referred to as "PC-specific information P1, P2, . . . "). The PC-specific information P1, P2, . . . of each user is information created on the basis of information specific to the client apparatus of the user, such as a unique MAC (Media Access Control) address of the user's client apparatus, ID number unique to the apparatus (e.g., unique to the hard disk device or the like) and video card number, and a plurality of different PC-specific information P1, P2, . . . may be created per client apparatus. The PC-specific information P1, P2, . . . is transferred from the client apparatus to the server 20 by means of a function of the dedicated application program.

The music piece data sets M1, M2, M3, . . . may be "multimedia data sets" each including not only music piece data to be used for music reproduction but also a plurality of music-content-related element data pertaining to an animation, still image, text (lyrics), etc. In the illustrated example, each of the music piece data sets M1, M2, M3, . . . includes music-content-related element data, such as: a unique music piece number assigned to the music piece data set; automatic performance data, e.g., MIDI data in the SMF (Smart MIDI File) format of the music piece; singing voice data, e.g., audio waveform data in, for example, the MP3 format of the music piece; video data in, for example, the MPEG format; still image data in, for example, the JPEG format; music-score-display assisting data in, for example, the Scorch XF format; and other data. The above-mentioned music-content-related element data may be in any other suitable one of the conventionally-known data formats than the above-mentioned. These music-content-related element data can be reproduced in a synchronized fashion. As will be later described, by reproducing suitable ones (i.e., a suitable combination) of the various element data in a synchronized fashion as may be required by a desired form of use of the content, such as ordinary audio reproduction, karaoke or performance lessen, of the content, content reproduction corresponding to the user desired form of use can be implemented. Note that the above-described data organization of the music piece data sets is just illustrative and the present invention is not limited to the above-described data organization.

The first and second management information is stored per music piece, and example data organizations of the first and second management information will be discussed later.

Figure 4:
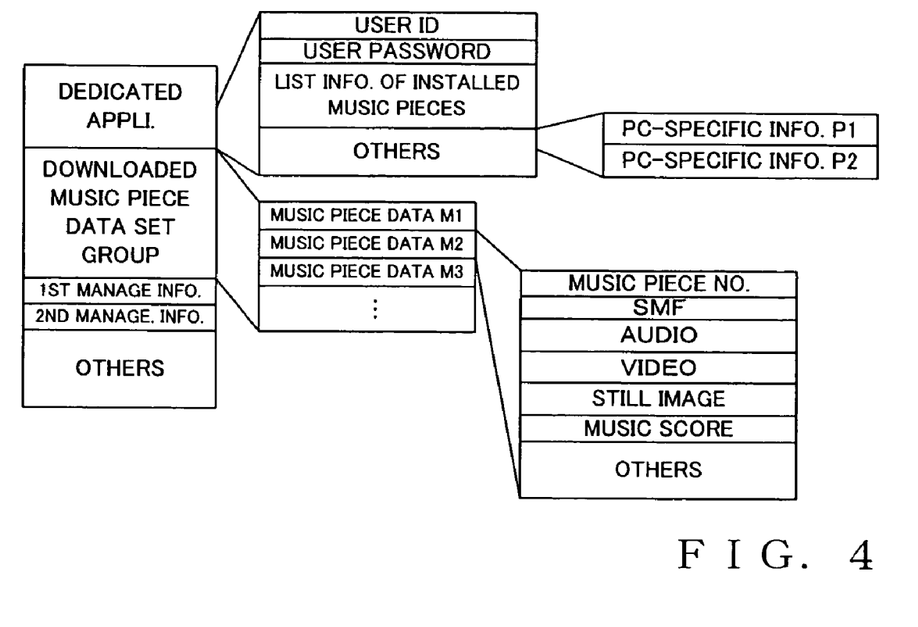
FIG. 4 is a diagram showing an example of stored contents in a hard disk device of the client apparatus in the embodiment.

FIG. 4 is a diagram showing an example of stored contents in the HDD 4 of the client apparatus 10, 11, 12, . . . . As shown, the HDD 4 of the client apparatus stores the dedicated application program, downloaded music piece data sets M1, M2, M3, . . . (music piece data set group), and the first and second management information corresponding to the music piece data sets M1, M2, M3, . . . . In the same region where the dedicated application program is stored, there are stored various items of user information, such as the user ID and user password and PC-specific information P1, P2, . . . , created by the dedicated application program, as well as list information representative of music pieces already installed in the client apparatus. Whereas the PC-specific information P1, P2, . . . are shown in FIG. 4 as stored in the stored region of the dedicated application program, such PC-specific information may be generated by the dedicated application program each time it becomes necessary, without being stored in the HDD 4. The list information represents a listing of music piece data sets downloaded and recorded in the HDD 4 as a downloaded music piece data set group.

In the instant embodiment, the first and second management information is generally identical to each other in terms of their respective data organizations. For example, each of the first and second management information includes a music piece number of the corresponding music piece, purchase information indicative of whether or not the predetermined purchase procedure by the user has been completed for the corresponding music piece data set, recorded address, in the HDD 4, of the corresponding music piece data set, reproduction function information indicative of a reproduction function (i.e., reproducibility) limitation to be applied at the time of test-listening of the music piece data set, and security information pertaining to copyright protection etc. The above-mentioned purchase information is a flag indicating, by "YES" or "NO", whether or not the predetermined purchase procedure has been duly performed by the user for the corresponding music piece data set. In accordance with the YES or NO indication of the flag, a determination is made as to whether the reproduction function limitation information should be made valid or invalid (i.e., enabled or disabled). Namely, in the first management information, the flag indicates "NO" (i.e. indicates that no purchase procedure has been performed by the user), so that the reproduction function limitation information is enabled and the data reproduction is carried out on a trial basis with a reproduction function limitation. In the second management information, on the other hand, the flag indicates "YES" (i.e. indicates that the predetermined purchase procedure has been performed by the user), so that the reproduction function limitation information is disabled to allow the corresponding music piece data set to be reproduced normally in a full reproduction function mode with the reproduction function limitation information ignored. In FIG. 4, the first and second management information is shown as stored in separate storage regions, but these two management information may be stored in the same storage region. When the music piece data set is to be used (i.e., to be reproduced), the corresponding management information is read out on the basis of the music piece number of the music piece data set to be reproduced. At that time, if the read-out management information can be decrypted with the first encryption key, then the read-out management information can be judged to be the first management information, while, if the read-out management information can be decrypted with the second encryption key, the read-out management information can be judged to be the second management information. Further, in case the read-out management information can not be decrypted with either one of the first and second encryption key, then the read-out management information can be judged to be unfairly-copied content (i.e., content copied without authorization).

The reproduction function limitation information is information to limit, for example, a reproducible time length of the music piece data set. In the instant embodiment, the reproducible time length limitation can be set separately for each of the various element data included in the music piece data set. Copyright holder or the like of each of the music piece data sets and each of the element data can set such a reproduction function limitation as desired. For example, by allowing the music piece data set to be reproduced only for, say, 20 seconds on the basis of the reproduction function limitation information, only a part of the music content in question can be reproduced for test-listening (trial use). The security information comprises, for example, data indicating whether or not editing or re-distribution by the user is allowable, which can be set per music piece data set as desired by the copyright holder or the like. Such security information may all be set as "non-allowable" if the right holder or the like positively indicates allowability for editing, re-distribution or other action by the user. Whereas the first and second management information is shown in FIG. 4 as stored in separate storage regions, these two management information may be stored in the same storage region and managed collectively.

Figure 5:
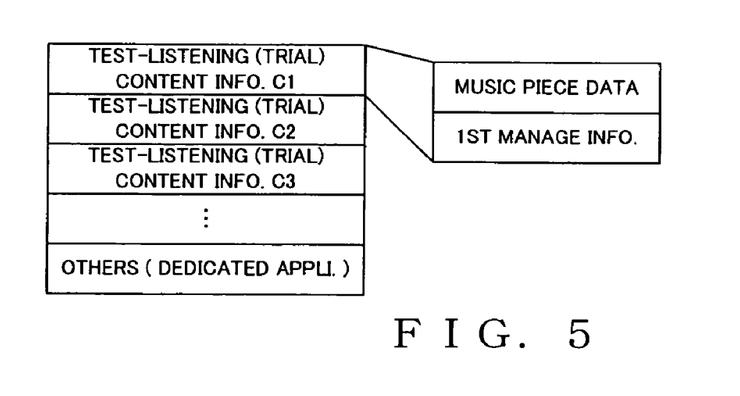
FIG. 5 is a diagram showing an example of stored contents in a CD-ROM for supplying trial content information in the embodiment.

FIG. 5 is a diagram showing an example of stored contents in the CD-ROM 5 to be used for supplying "trial content information". In the CD-ROM 5, there are stored a plurality of items of trial content information C1, C2, C3, . . . each including a music piece data set and first management information. The list information represents a listing of trial content information etc. stored in the HDD 4 may be stored in the CD-ROM 5, as necessary.

Now, a description will be given about processing performed by the client apparatus for acquiring the "trial content information", with reference to FIGS. 6A and 6B. FIG. 7 is a functional block diagram explanatory of the content supply process and content decryption/encryption process performed by execution of the dedicated application program. Note that the decryption/encryption section 70 shown in FIG. 7 is a software process performed by the CPU 1 as part of the function of the dedicated application, which may employ any one of the conventionally-known decryption/encryption methods.

In the case where trial content information is supplied from the CD-ROM 5, the user first boots up the dedicated application program in his or her client apparatus, so that a trial content information acquisition process is started up. Once the CD-ROM 5 is set in the client apparatus, a list of a plurality of items of trial content information (music piece data sets) stored on the CD-ROM 5 is displayed on the display device 7. The list may contain music piece names and numbers corresponding to the items of trial content information, and other suitable information. Then, the user uses the input operator device 6, such as the mouse and keyboard, to select any one of the displayed items of trial content information to be reproduced for test-listening, and then issues a test-listening request. In response to the test-listening request, the trial content information corresponding to the user-selected music piece, i.e. the music piece data set of the music piece which the user desires to test-listen to and the corresponding first management information, is read out in the encrypted form from the CD-ROM 5 into the HDD 4, as represented by arrow 72 in FIG. 7. In this manner, music piece data sets of a plurality of music pieces and corresponding management information (i.e., a plurality of items of trial content information) can be stored into the HDD 4 in the client apparatus, by the user issuing test-listening requests for the individual music piece data sets to be reproduced for test-listening. The music piece data sets thus stored in the HDD 4 are shown in FIG. 4 as a "downloaded music piece data set group". FIG. 6A shows the process for installing the trial content information from the CD-ROM 5.

This and following paragraphs describe examples of processing performed by the client apparatus and server apparatus in the case where trial content information is supplied from the server 20. FIG. 6B shows an example of a process for downloading the trial content information from the server 20. First, in the client apparatus, the user accesses a Web site managed by the server 20, by way of the communication network X (see FIG. 1), such as the Internet. At that time, the user enters a predetermined user ID and user password that are currently stored in the server 20 (see FIGS. 3 and 4). Then, the server 20 transmits, to the client apparatus of the user, list information representative of items of trial content information (music piece data sets) that can be supplied thereby. Upon receipt of the list information, the client apparatus of the user displays a list on the display 7 device on the basis of the list information. Once the user selects any one of the listed music piece data sets to be reproduced for test-listening and issues a test-listening request, the music piece number of the user-selected music piece data set is transmitted to the server 20. In turn, the server 20 reads out, from its hard disk device, the trial content information that includes the music piece data set corresponding to the music piece number received form the client apparatus and then transmits the read-out trial content information, in the form encrypted by the dedicated application program with the known first encryption key, to the client apparatus. Then, the client apparatus, having received the trial content information (i.e., music piece data set and corresponding first management information) encrypted by the dedicated application program with the known first encryption key, stores the trial content information into the HDD 4 still in the form encrypted with the first encryption key, as represented by arrow 72 in FIG. 7. In this way, music piece data sets of a plurality of music pieces can be stored into the HDD 4 in the client apparatus, in generally the same manner as in the process of FIG. 6A ("downloaded music piece data set group" in FIG. 4).

Figure 6A:
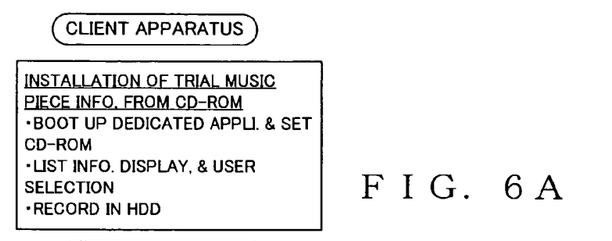
FIG. 6A is a diagram showing an example of a process for supplying test-listening content information from the CD-ROM to the client apparatus in the embodiment.
Figure 6B:
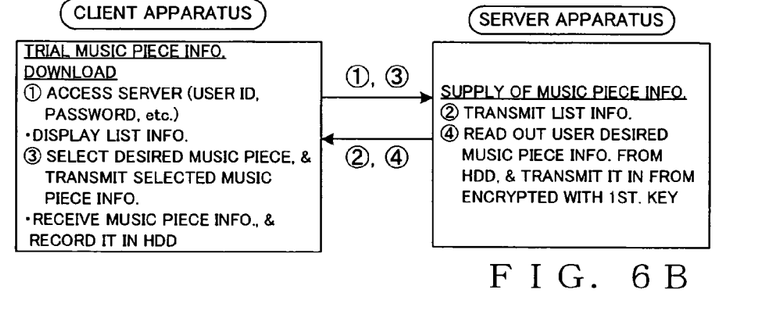
FIG. 6B is a diagram showing an example of a process for delivering test-listening content information from the server, via a communication network, to the client apparatus in the embodiment.
Figure 7:
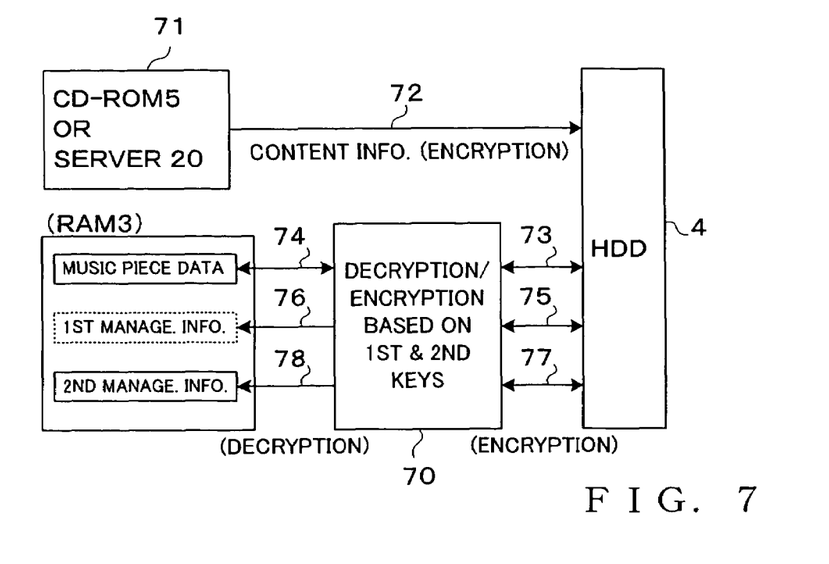
FIG. 7 is a functional block diagram explanatory of a decryption/encryption process performed in the embodiment.

Note that, in the examples of FIGS. 6A and 6B, the first encryption key for encrypting the trial content information (i.e., music piece data set and corresponding first management information) may differ between the music piece data set and the first management information, as long as the different keys are previously known by the dedicated application program.

Decryption process performed for test-listening of trial content information stored in the HDD 4 is briefed here. In FIG. 7, trial content information (i.e., music piece data set and corresponding first management information) supplied from an external data supply source 71, such as the CD-ROM 5 or server 20, is stored into the HDD 4 in a form encrypted with the first encryption key previously known by the dedicated application program. The music piece data set and corresponding first management information, both encrypted with the first encryption key, are supplied to the decryption/encryption section 70, as represented by arrows 73 and 75 in FIG. 7.

The decryption/encryption section 70 carries out the decryption process in accordance with the dedicated application program to decrypt the supplied music piece data and first management information with the first encryption key. The resultant decrypted music piece data and first management information are supplied to the RAM 3, as represented by arrows 74 and 76 in FIG. 7. The decrypted music piece data thus read into the RAM 3 can be audibly reproduced on the basis of the corresponding first management information. When the music piece data set is to be reproduced on the basis of the corresponding first management information, the reproduction function limitation information included in the first management information is enabled, so that reproduction of the music piece data set with a limited reproduction time length is carried out on the basis of the limitation information. In this way, the user can test-listen to the music piece data set.

The music piece data set and first management information are lost after completion of the trial data use or reproduction. However, if the music piece data set has been subjected to desired modification, such as editing, the modified music piece data set is supplied from the RAM 3 to the decryption/encryption section 70, as represented by arrow 74 in FIG. 7. Then, the modified music piece data set is again encrypted with the first encryption key and replaces the data stored in the HDD 4, as represented by arrow 73 in FIG. 7. These modification-related operations may perhaps take place when the user uses a duly-purchased music piece data set rather than when test-listening a music piece data set of trial content information.

Figure 6C:
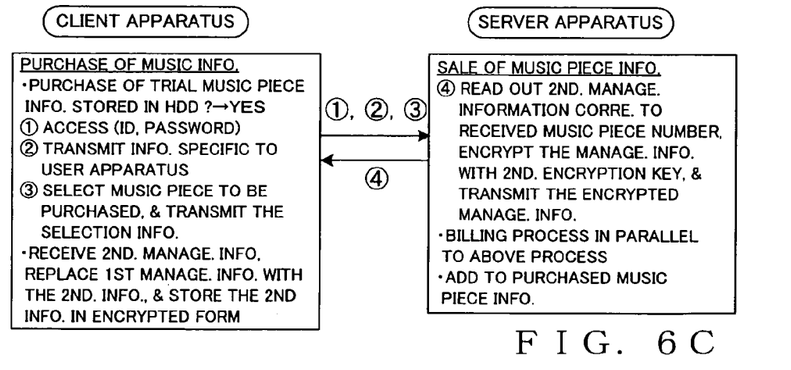
FIG. 6C is a diagram showing an example of processes performed by the client apparatus and server apparatus when a user of the client apparatus purchases a music piece data set after test-listening.

Next, a description will be given about examples of processing performed by the client apparatus and server apparatus when the user of the client apparatus purchases a music piece data set after test-listening, with reference to FIG. 6C. When purchasing content information corresponding to trial content information already contained in the HDD 4 is to be purchased, the user accesses a Web site managed by the server 20 and enters the predetermined user ID and user password that are currently stored in the server 20 (see FIGS. 3 and 4). Once communication connection to the server 20 is completed, the information specific to the client apparatus (PC-specific information P1, P2, ... of FIG. 4), currently stored in the HDD 4 of the client apparatus, is transmitted to the server 20. Then, the user selects any one item of content to be purchased from among one or more items of the trial content information ("downloaded music piece data set group") currently recorded in the client's HDD 4, so that the music piece number corresponding to the selected music piece data set is transmitted to the server 20. At that time, a flag indicating that the selected music piece data set has already been test-listened is set and transmitted along with the music piece number, so as to inform the server 20 that the music piece data set has already been test-listened by the user. For example, the selection of the music piece to be purchased may be may by displaying, on the display device 7, the list of the items of trial content information ("downloaded music piece data set group") currently recorded in the client's HDD so that the user can select a desired music piece in accordance with the displayed screen. The server 20 confirms, from the test-listening flag received along with the music piece number from the client apparatus, that the requested music piece data set has already been test-listened, i.e. that the music piece data set has already been stored in the client apparatus. Then, the server 20 reads out the second management information corresponding to the received music piece number from the hard disk device (FIG. 3), and it transmits the read-out second management information alone to the purchase-requesting client apparatus in the form encrypted with the second encryption key based on the PC-specific information P1, P2, . . . of the client apparatus. Namely, because the second management information, intended to permit normal reproduction of the music piece data set with no limitation, is encrypted with the second encryption key based on the PC-specific information P1, P2, . . . of the client apparatus, decryption of the second management information is permitted only in the client apparatus having completed the predetermined purchase procedure. Namely, only in the client apparatus having completed the predetermined purchase procedure. the music piece data set can be reproduced normally with no reproduction limitation. The client apparatus receives the second management information from the server 20, and the first management information, corresponding to the purchased music piece data set, is replaced with the received second management information in the HDD 4, so that the second management information is stored in the HDD 4 while being still held in the form encrypted with the second encryption key.

In parallel to the music piece purchase process, a predetermined billing or charging process may be performed for the music piece data set. Namely, once the server confirms that a predetermined charging condition matching a charge for the music piece data set (such as completion of predetermined charge settlement by the user) has been satisfied, it determines that the second management information corresponding to the music piece data set may be given to the requesting client apparatus, i.e. that an authorization for normal use of the music piece data set may be given to the requesting client apparatus, and then the billing process is brought to an end. After the music piece purchase procedure has been completed (i.e., the second management information has been stored in the HDD 4), the purchased music piece data set is added to the purchased music piece data set list (see FIG. 4).

Note that the determination as to the allowability/non-allowability of the authorization for normal use of the music piece data set may be may be made in any other suitable manner than through the above-mentioned billing process; for example, a monthly membership fee may be collected from each registered user, and the authorization for normal use of the music piece data set may be given on condition that the user has duly paid the membership fee.

Figure 6D:
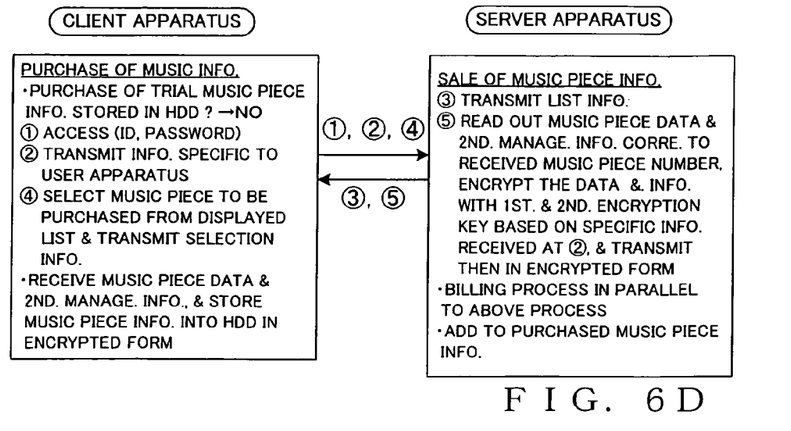
FIG. 6D is a diagram showing another example of the music piece data purchase process, where a given user purchases a music piece data set without test-listening.

FIG. 6D shows another example of the music piece data purchase processing, where a given user purchases a desired music piece data set which the user has not test-listened to, i.e. which is not stored in the HDD 4 of the user's client apparatus. In this case, the user accesses, via the communication network X, a Web site managed by the server 20 and transmits the PC-specific information P1, P2, . . . of the client apparatus to the server 20 along with the flag indicating that he or she has not test-listened to the desired music piece data set, i.e. that the desired music piece data set has not yet been stored in the HDD 4 of the user's client apparatus. In turn, the server 20 transmits, to the client apparatus of the user, list information representative of items of trial content information (music piece data sets) that can be supplied thereby. Then, once the user selects a desired music piece data set from among the list information, the client apparatus sends the music piece number of the selected music piece to the server 20 along with a purchase request for the music piece data set. Then, the server 20 reads out, from its HDD 4, the music piece data set corresponding to the music piece number and second management information corresponding to the music piece data set, encrypts the read-out music piece data with the known first encryption key, encrypts the read-out second management information with the second encryption key based on the PC-specific information received from the client apparatus, and then transmits together the encrypted music piece data set and second management information to the client apparatus. Thus, the music piece data set, purchase of which has been requested directly from the list information, and the corresponding second management information are stored into the HDD 4 of the client apparatus.

Decryption process performed for decrypting the music piece data set and second management information stored in the HDD 4 in the above-described manner is briefed here. The music piece data set encrypted with the first encryption key and the corresponding second management information encrypted with the second encryption key are supplied from the HDD 4 to the decryption/encryption section 70 in the encrypted form, as represented by arrows 73 and 77 in FIG. 7. The decryption/encryption section 70 carries out a decryption process, in accordance with the dedicated application program, to decrypt the supplied music piece data set on the basis of the known first encryption key and decrypts the second management information with the second encryption key based on the PC-specific information P1, P2, . . . of the client apparatus. The resultant decrypted music piece data set and second management information are supplied to the RAM 3, as represented by arrows 74 and 78 in FIG. 7. The decrypted music piece data thus read into the RAM 3 can be audibly reproduced on the basis of the corresponding second management information. In case the music piece data and second management information are unfairly copied into another apparatus without due authorization, they can not be decrypted on the basis of the second encryption key; thus, the instant embodiment can reliably prevent the data and information from being unfairly used by any other user than the user having duly purchased the content. If the music piece data set temporarily stored in the RAM 3 has been subjected to desired modification, such as editing, the modified music piece data set is supplied from the RAM 3 to the decryption/encryption section 70, as represented by arrow 74 in FIG. 7. Then, the modified music piece data set is again encrypted with the first encryption key and stored into the HDD 4, as represented by arrow 73 in FIG. 7.

The instant embodiment has been described above in relation to the case where the second management information is encrypted by the server 20 and the thus-encrypted second management information is stored in the HDD 4 of the client apparatus, the present invention is not so limited. Alternatively, the second management information may be encrypted by the client apparatus using the second encryption key in accordance with the dedicated application program and then stored into the HDD 4 of the client apparatus.

Figure 8:
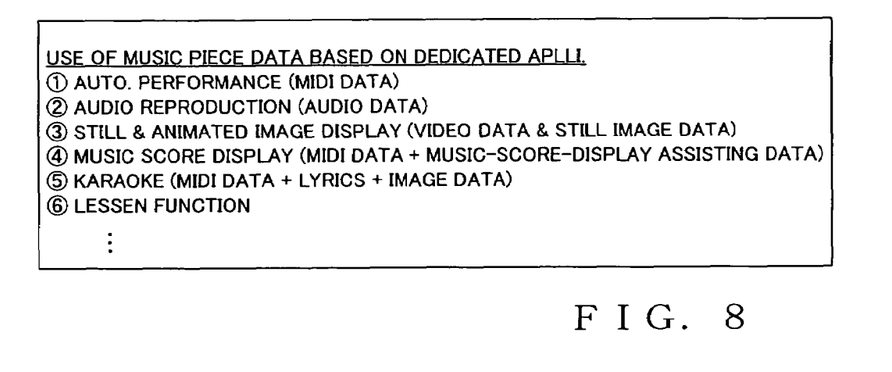
FIG. 8 is a conceptual diagram showing various forms of use of music piece data reproduced in the embodiment.

This and following paragraphs describe various forms of use of a purchased music piece data set. Music piece data reproduction process is carried out in the client apparatus, using the dedicated application program, independently of the server apparatus 20. As set forth above, each of the music piece data set is a "multimedia data set" each including a plurality of element data, such as MIDI data, audio data and image data. Various forms of use as illustrated in FIG. 8 can be implemented by combining necessary ones of these data and reproducing the combined data in a synchronized fashion. Namely, in addition to reproduction of the individual element data included in the music piece data set, the instant embodiment can display a music score by generating music score image data on the basis of the SMF data and music-score-display assisting data, perform a performance guide function in accordance with a progression of a music piece on the basis of the SMF data and suitable image data, and/or display, on the basis of the SMF data, lyrics and background image to a reproduced music piece in synchronism with an automatic performance.

The content supply system of the present invention can be suitably used to supply a great quantity of multimedia data, because it allows each user to install a music piece data set only once when the user desires to purchase a desired music piece data set. Further, in cases where an electronic musical instrument equipped with a LAN communication function etc. is used as the client apparatus, it is highly preferable to enhance various functions, such as the performance lessen function and music score display function using such multimedia data.

In the above-described embodiment, the first and second management information is generally identical to each other in their data organization, and either one of the first and second management information is used depending on whether the predetermined purchase procedure has been performed or not; namely, the management information that can function effectively is switched between the first and second management information depending on whether the predetermined purchase procedure has been performed or not. Alternatively, one and the same management information may be caused to function as the first management information when decrypted with the first encryption key, but as the second management information when decrypted with the second encryption key. Alternatively, the first and second management information may be formed into different data organizations, rather than the generally identical data organization.

Further, whereas all of the data acquisition, test-listening, purchase, reproduction and data decryption/encryption processes (performed by the decryption/encryption 70 of FIG. 7) have been described above as executed in accordance with the dedicated application program, these processes may alternatively be performed by dedicated hardware implementing such functions. Furthermore, as the music piece data set to be supplied from the server, a trial music piece data set and a purchasing music piece data set, differing in substance and quality, may be supplied to an interested user without departing from the basic principles of the present invention.

Furthermore, the embodiment of the present invention has been described above in relation to the content supply system supplying music piece data sets, the supply system may supply any other desired digital content, such as animated image data. The dedicated application program of the present invention may be delivered from the server 20 to the client apparatus 10, 11, 12, . . . via the communication network X, or may be stored in a suitable recording medium, such as a CD-ROM, and supplied to the client apparatus in the CD-ROM. Note that the music content supply system implemented in accordance with the present invention can be suitably used to build a system where music content is sold and a charge is made for each music content sold. Of course, a form of system management is also possible where the dedicated application program is supplied to the users on a free-of-charge basis. Furthermore, whereas the embodiment of the present invention has been described above in relation to sales of music piece data, the present invention may be implemented as a music-piece-data renting system.

In summary, according to the present invention, trial content information, including content data and first management information corresponding to the content data, is supplied to a client apparatus of a user desiring trial use of the content, and the content is reproduced on a trial basis with a content use limitation applied to the reproduction of the content based on the first management information. Then, second management information is supplied to the client apparatus if the user has requested purchase of desired content, to permit regular or normal use of the desired content. With such arrangements, the present invention allows the user to download the desired content data only once, thereby achieving efficient content delivery. Further, because the second management information is encrypted with information specific to that client apparatus, the present invention can achieve an enhanced security against unfair or unauthorized copying etc. and thereby enhance protection of copyrights etc. in digital content delivery.

What is claimed is:

1. A method for execution by a client apparatus, connected to a communication network, to receive content data, said method comprising:

a step of receiving, from an external content supplier, content data and first management information that enables trial use of the content data and then storing the received content data and first management information in memory;

a step of, in response to operation of a user of said client apparatus desiring normal use of the content data stored in said memory, issuing a normal use request to a server apparatus connected to the communication network;

a step of receiving, via the communication network, second management information supplied by said server apparatus in response to the normal use request, said second management information authorizing the normal use of the content data;

a step of, in response to reception of said second management information from said server apparatus, replacing said first management information corresponding to the content data of which the normal use is requested, stored in said memory, with said second management information and a reproduction control step of, when desired content data is to be reproduced by said client apparatus, reproducing the content data on a trial basis with a limited reproduction function if said first management information is attached to the content data to be reproduced, and reproducing the content data normally with no reproduction function limitation if said second management information is attached to the content data to be reproduced.

2. A method as claimed in claim 1, wherein said second management information is stored in said memory after being encrypted, using as an encryption key predetermined information specific to said client apparatus, and which further includes a step of, when said second management information encrypted and stored in said memory is to be read out from said memory for reproduction of the desired content data, decrypting said second management information, using as a decryption key, the predetermined information specific to said client apparatus.

3. A method as claimed in claim 1, wherein said external content supplier is a recording medium storing the content data and said first management information that enables trial use of the content data, and said recording medium is removably attached to said client apparatus.

4. A method as claimed in claim 1, wherein said external content supplier is a storage device storing the content data and said first management information that enables trial use of the content data, and said storage device is connected to said server apparatus.

5. A method as claimed in claim 1, wherein at least the content data supplied by said external supplier is data encrypted in a predetermined manner, and which further includes a step of decrypting the encrypted content data using a common decryption key.

6. A method as claimed in claim 1, wherein at least the content data supplied by said server apparatus is data encrypted in a predetermined manner, and which further includes a step of decrypting the encrypted content data using a common decryption key.

7. A method as claimed in claim 1, wherein said first management information and said second management information are identical to each other in data organization, said data organization including data of limitation information for providing trial use of desired content data and data of regular use information indicative of whether regular use of desired content data is "allowable" or "non-allowable", the data of regular use information included in said first management information indicates "non-allowable" and the data of regular use information included in said second management information indicates "allowable", and wherein,
when the data of regular use information indicates "non-allowable", desired content data is allowed to be used only on a trial basis in accordance with the limitation information, and when the data of regular use information indicates "allowable", desired content data is allowed to be used normally without being limited in accordance with the limitation information.

8. A method as claimed in claim 1, wherein said external content supplier is a storage device storing the content data and said first management information that enables trial use of the content data, and said storage device is connected to said communication network.

9. A method for execution by a server apparatus to supply content data to a client apparatus connected to a communication network, said method comprising:
a step of receiving, via the communication network, a normal use request of content data from a client apparatus having already stored therein the content data and first management information that enables trial use of the content data; and
a transmission step of determining, in response to the normal use request received from said client apparatus, whether the normal use of the content data is allowable or non-allowable, and transmitting second management information authorizing the normal use of the content data to said client apparatus via the communication network if the normal use of the content data has been determined as allowable, wherein
in response to reception of said second management information from said server apparatus, said client apparatus replaces said first management information, corresponding to the content data of which the normal use is requested, with said second management information, so that the normal use of the content data is permitted, and
said client apparatus reproduces the content data on a trial basis with a limited reproduction function if said first management information is attached to the content data to be reproduced, and reproduces the content data normally with no reproduction function limitation if said second management information is attached to the content data to be reproduced.

10. A method as claimed in claim 9, further including an encryption step of encrypting said second management information to be transmitted to said client apparatus, using as an encryption key predetermined information specific to said client apparatus, and wherein said transmission step transmits said second management information encrypted by said encryption step to said client apparatus.

11. A method as claimed in claim 9, wherein said server apparatus includes memory for storing said second management information for a plurality of items of content data, and said transmission step reads out, from said memory, said second management information of content data of which the normal use has been determined as allowable.

12. A method as claimed in claim 9, wherein said first management information and said second management information are identical to each other in data organization, said data organization including data of limitation information for providing trial use of desired content data and data of regular use information indicative of whether regular use of desired content data is "allowable" or "non-allowable", the data of regular use information included in said first management information indicates "non-allowable" and the data of regular use information included in said second management information indicates "allowable", the data of regular use information included in said first management information indicates "non-allowable" and the data of regular use information included in said second management information indicates "allowable", and wherein
when the data of regular use information indicates "non-allowable", desired content data is allowed to be used only on a trial basis in accordance with the limitation information, and when the data of regular use information indicates "allowable", desired content data is allowed to be used normally without being limited in accordance with the limitation information.

13. A computer-readable medium having included thereon program code including instructions which when executed cause a computer of a client apparatus to perform a method for execution by the client apparatus, connected to a communication network, to receive content data, said method comprising:
a step of receiving, from an external content supplier, content data and first management information that enables trial use of the content data and then storing the received content data and first management information in memory;
a step of, in response to operation of a user of said client apparatus desiring normal use of the content data stored in said memory, issuing a normal use request to a server apparatus connected to the communication network; a step of receiving, via the communication network, second management information supplied by said server apparatus in response to the normal use request, said second management information authorizing the normal use of the content data;
a step of, in response to reception of said second management information from said server apparatus, replacing said first management information corresponding to the content data of which the normal use is requested, stored in said memory, with said second management information ; and
a reproduction control step of when desired content data is to be reproduced by said client apparatus, reproducing the content data on a trial basis with a limited reproduction function if said first management information is attached to the content data to be reproduced, and reproducing the content data normally with no reproduction function limitation if said second management information is attached to the content data to be reproduced.

14. A computer-readable medium having included thereon program code including instructions which when executed cause a computer of a server apparatus to perform a method for execution by said server apparatus to supply content data to a client apparatus connected to a communication network, said method comprising:
   a step of receiving, via the communication network, a normal use request of content data from a client apparatus having already stored therein the content data and first management information that enables trial use of the content data; and
   a transmission step of determining, in response to the normal use request received from said client apparatus, whether the normal use of the content data is allowable or non-allowable, and transmitting second management information authorizing the normal use of the content data to said client apparatus via the communication network if the normal use of the content data has been determined as allowable, wherein
   in response to reception of said second management information from said server apparatus, said client apparatus replaces said first management information, corresponding to the content data of which the normal use is requested, with said second management information, so that the normal use of the content data is permitted, and
   said client apparatus reproduces the content data on a trial basis with a limited reproduction function if said first management information is attached to the content data to be reproduced, and reproduces the content data normally with no reproduction function limitation if said second management information is attached to the content data to be reproduced.

15. A client apparatus comprising:
   a storage device that stores content data and first management information supplied by an external content supplier, said first management information enabling trial use of the content data; and
   a processing device coupled with said storage device and adapted to:
      in response to operation of a user of said client apparatus desiring normal use of the content data stored in said memory, issue a normal use request to a server apparatus connected to a communication network;
      via the communication network, receive second management information supplied by said server apparatus in response. to the normal use request, said second management information authorizing the normal use of the content data;
      in response to reception of said second management information, replace said first management information corresponding to the content data of which the normal use is requested, stored in said memory, with said second management information; and
      when desired content data is to be reproduced by said client apparatus, reproduce the content data on a trial basis with a limited reproduction function if said first management information is attached to the content data to be reproduced, and reproduce the content data normally with no reproduction function limitation if said second management information is attached to the content data to be reproduced.

16. An apparatus as claimed in claim 15, wherein said first management information and said second management information are identical to each other in data organization, said data organization including data of limitation information for providing trial use of desired content data and data of regular use information indicative of whether regular use of desired content data is "allowable" or "non-allowable", the data of regular use information included in said first management information indicates "non-allowable" and the data of regular use information included in said second management information indicates "allowable", the data of regular use information included in said first management information indicates "non-allowable" and the data of regular use information included in said second management information indicates "allowable", and wherein
   when the data of regular use information indicates "non-allowable", said desired content data is allowed to be used only on a trial basis in accordance with the limitation information, and
   when the data of regular use information indicates "allowable", said desired content data is allowed to be used normally without being limited in accordance with the limitation information.

17. A server apparatus connectable to a client apparatus via a communication network, said server apparatus comprising:
   a receiver that receives, via the communication network, a normal use request of content data from a client apparatus having already stored therein the content data and first management information that enables trial use of the content data; a transmitter; and
   a processor coupled with said receiver and said transmitter, said processor adapted to:
      in response to the normal use request received from the client apparatus, determine whether the normal use of the content data is allowable or non-allowable; and
      transmit second management information authorizing the normal use of the content data to the client apparatus via said transmitter and the communication network if the normal use of the content data has been determined as allowable, wherein
   in response to reception of said second management information from said server apparatus, said client apparatus replaces said first management information, corresponding to the content data of which the normal use is requested, with said second management information, so that the normal use of the content data is permitted, and
   said client apparatus reproduces the content data on a trial basis with a limited reproduction function if said first management information is attached to the content data to be reproduced, and reproduces the content data normally with no reproduction function limitation if said second management information is attached to the content data to be reproduced.

18. A server apparatus as claimed in claim 17, further including a memory storing said second management information for a plurality of items of content data, and said transmission step reads out, from said memory, said second management information of content data of which the normal use has been determined as allowable.

19. An apparatus as claimed in claim 18, wherein said first management information and said second management information are identical to each other in data organization, said data organization including data of limitation information for providing trial use of desired content data and data of regular use information indicative of whether regular use of desired content data is "allowable" or "non-allowable", the data of regular use information included in said first management information indicates "non-allowable" and the data of regular use information included in said second management information indicates "allowable", the data of regular use information included in said first management information indicates "non-allowable" and the data of regular use information included in said second management information indicates "allowable", and wherein when the data of regular use information indicates "non-allowable", said desired content data is allowed to be used only on a trial basis in accordance with the limitation information, and when the data of regular use information indicates "allowable", said desired content data is allowed to be used normally without being limited in accordance with the limitation information.

* * * * *